United States Patent
Eklund et al.

(10) Patent No.: US 8,213,771 B2
(45) Date of Patent: Jul. 3, 2012

(54) TEMPLATIZED COMMANDS IN DISC AUTHORING

(75) Inventors: Don Eklund, Yorba Linda, CA (US); Sumit Malik, Pasadena, CA (US); Raja Sahi, Los Angeles, CA (US); Tommy Choy, Lakewood, CA (US)

(73) Assignees: Sony Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 77 days.

(21) Appl. No.: 11/467,892

(22) Filed: Aug. 28, 2006

(65) Prior Publication Data
US 2007/0047924 A1 Mar. 1, 2007

Related U.S. Application Data

(60) Provisional application No. 60/712,685, filed on Aug. 29, 2005, provisional application No. 60/712,684, filed on Aug. 29, 2005.

(51) Int. Cl.
*G11B 27/00* (2006.01)
*H04N 5/93* (2006.01)
*H04N 9/80* (2006.01)

(52) U.S. Cl. ........ 386/278; 386/239; 386/240; 386/248; 386/286

(58) Field of Classification Search .................. 386/126, 386/239–248, 278–290; 717/100–119; 703/11
See application file for complete search history.

(56) References Cited

U.S. PATENT DOCUMENTS

| | | | |
|---|---|---|---|
| 3,088,996 A | 5/1963 | Carter | |
| 5,307,456 A | 4/1994 | Mackay | |
| 5,907,704 A | 5/1999 | Gudmundson et al. | |
| 6,404,711 B1 | 6/2002 | Kato | |
| 6,453,459 B1 * | 9/2002 | Brodersen et al. | 717/100 |
| 6,807,363 B1 | 10/2004 | Abiko et al. | |
| 2002/0112226 A1 | 8/2002 | Brodersen et al. | |
| 2002/0174438 A1 | 11/2002 | Cleary et al. | |
| 2003/0193520 A1 | 10/2003 | Detzel | |
| 2004/0167916 A1 | 8/2004 | Basso et al. | |
| 2004/0210896 A1 | 10/2004 | Chou et al. | |
| 2004/0220791 A1 * | 11/2004 | Lamkin et al. | 703/11 |
| 2004/0240360 A1 | 12/2004 | Kim et al. | |

(Continued)

FOREIGN PATENT DOCUMENTS

JP 2003-202994 A 7/2003

(Continued)

OTHER PUBLICATIONS

International Search Report/Written Opinion issued in PCT/US06/26058 on Jun. 27, 2008.

(Continued)

*Primary Examiner* — Thai Tran
*Assistant Examiner* — Hung Dang
(74) *Attorney, Agent, or Firm* — Samuel S. Lee; Procopio, Cory, Hargreaves & Savitch LLP (57) ABSTRACT

Authoring a Blu-ray disc (BD), comprising: generating a template code representing templatized navigation commands, the template code specifying a first object to be processed, wherein the templatized navigation commands are used to provide navigational control of the BD using playable content; converting the template code to generate multiple lines of low level code; and automatically placing the low level code at multiple positions on the BD to effect desired behaviors by the BD.

25 Claims, 10 Drawing Sheets

U.S. PATENT DOCUMENTS

| | | | |
|---|---|---|---|
| 2005/0013593 | A1 | 1/2005 | Jung et al. |
| 2005/0094972 | A1 | 5/2005 | Green |
| 2005/0114909 | A1 | 5/2005 | Mercier |
| 2005/0155058 | A1* | 7/2005 | Jung et al. .................. 725/38 |
| 2005/0185929 | A1 | 8/2005 | Kang et al. |
| 2006/0165388 | A1 | 7/2006 | Uesaka et al. |
| 2006/0277588 | A1 | 12/2006 | Harrington et al. |

FOREIGN PATENT DOCUMENTS

| | | |
|---|---|---|
| WO | 99/38098 | 7/1999 |
| WO | 0135412 | 5/2001 |
| WO | 03021458 | 3/2003 |
| WO | 03/088248 | 10/2003 |
| WO | 2005/002232 | 1/2005 |
| WO | 2005/069615 A1 | 7/2005 |

OTHER PUBLICATIONS

International Search Report/ Written Opinion issued in PCT/US06/34191 on Jul. 14, 2008.

International Search Report/ Written Opinion issued in PCT/US06/34190 on Jul. 8, 2008.

International Search Report and Written Opinion issued in PCT/US2006/34316 on Aug. 2, 2007.

International Search Report and Written Opinion issued in PCT/US2006/33915 on Apr. 12, 2007.

International Search Report and Written Opinion issued in PCT/US06/34309 on Apr. 9, 2007.

International Search Report and Written Opinion issued in PCT/US2006/34306 on Aug. 29, 2007.

International Search Report and Written Opinion issued in PCT/US06/34307 on Oct. 18, 2007.

International Preliminary Report on Patentability issued in International Patent Application No. PCT/US2006/034190 on Oct. 23, 2008.

Supplementary European Search Report issued in related European Patent Application No. 06790105.8, on Jun. 10, 2010, 11 pages.

Blu-Ray Disc: "White paper Blu-ray Disc Format 2.B Audio Visual Application Format Specifications for BD-ROM", internet citation, Mar. 31, 2005, XP-007903517, http://www.blu-raydisc.com/assets/downloadablefile/2b_bdrom_audiovisualapplication_0305-12955-13403.pdf, retrieved on Nov. 16, 2007, 35 pages.

"Application Definition Blu-ray Disc Format BD-J Baseline Application and Logical Model Definition for BD-ROM", internet citation, Mar. 1, 2005, pp. 1-45, XP007904998, http://www.blurayjukebox.com/pdfs/bdj_gem_application_definition_0503 07-13404>, 45 pages.

Supplementary European Search Report issued in related European Patent Application No. 06802841.4, on May 20, 2010, 10 pages.

Huges, Kilroy, "The Tools and Twists of DVD Authoring", EMedia Professional, vol. 10, No. 12, Dec. 1, 1997, pp. 37-40, 42, 44-46, 48 and 50, XP002110307, ISSN: 10-90-946X.

Supplementary European Search Report issued in related European Patent Application No. 06814057.3, on Jun. 16, 2010, 11 pages.

Ryu, Seong Won et al., "A Hierarchiacal Layered Model for DVD Authoring System", 19960801, IEEE Transactions on Consumer Electronics, vol. 42, No. 3, Aug. 1, 1996, pp. 814-819, XP011083523.

\* cited by examiner

Delayed Set Button ("Trailers Page", Spiderman)

FIG. 6

Delayed Set Stream (audio, graphics, subtitle, angle)

TEMPLATIZED COMMANDS IN DISC AUTHORING

RELATED APPLICATION

This application claims the benefit of priority of co-pending U.S. Provisional Patent Application Ser. No. 60/712,685, entitled "Rule-Based Authoring and Templatized Commands in Disc Authoring" and co-pending U.S. Provisional Patent Application Ser. No. 60/712,684, entitled "Abstractions in Disc Authoring", both filed Aug. 29, 2005. This application is also related to U.S. patent application Ser. No. 11/467,896, entitled "Abstractions in Disc Authoring", filed on the same day as this application. The disclosures of the above-referenced patent applications are hereby incorporated by reference.

BACKGROUND

The present invention relates generally to disc authoring and, more particularly, to providing templatized commands in authoring optical discs such as Blu-ray Discs.

A media authoring system is typically used to generate articles of media that are compliant with a particular standard. For example, a Digital Versatile Disc (DVD) authoring system is used to generate data, such as audio and video data and information used to present and access the audio and video data, on a DVD. The data on the disc is stored according to standards defined for DVD. Similarly, a Blu-ray Disc (BD) authoring system is used to create optical discs storing information according to the standards defined for BD.

SUMMARY

Implementations of the present invention include systems and methods to implement techniques for disc authoring using templatized commands.

In one implementation, a method of authoring a Blu-ray disc (BD) comprises: generating a template code representing templatized navigation commands, the template code specifying is a first object to be processed, wherein the templatized navigation commands are used to provide navigational control of the BD using playable content; converting the template code to generate multiple lines of low level code; and automatically placing the low level code at multiple positions on the BD to effect desired behaviors by the BD.

In another implementation, a Blu-ray disc (BD) authoring system comprises: a template code generator configured to generate a template code representing templatized navigation commands, the template code specifying a first object to be processed, wherein the templatized navigation commands are used to provide navigational control of the BD using playable content; and a code converter to converting the template code to generate multiple lines of low level code, and to automatically place the low level code at multiple positions on the BD to effect desired behaviors by the BD.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be understood in part by studying the accompanying drawings, in which like reference numerals refer to like parts, and in which.

DETAILED DESCRIPTION

As will be further described below, embodiments of the present invention provide the need for an efficient structure and configuration in authoring articles of media that are compliant with the Blu-ray Disc (BD) standard specifications. A BD authoring system (BDAS) executes instructions to store information based on the BD standard specifications. In one implementation, the BDAS provides a defined set of navigation commands (referred to as "templatized commands") that are used to provide navigational control of the BD.

After reading this description it will become apparent to one skilled in the art how to implement the invention in various embodiments and applications. However, although various embodiments of the present invention will be described herein, it is understood that these embodiments are presented by way of example only, and not limitation. As such, this detailed description of various embodiments should not be construed to limit the scope or breadth of the present invention as set forth in the appended claims.

The BD standard specifications include the BD Read Only Memory (BD-ROM) specification, which provides a number of data structures that needs to be defined on a BD in order for the disc to behave as desired. The BD-ROM specification defines BD Prerecorded and BD Recordable application formats.

Figure 1:
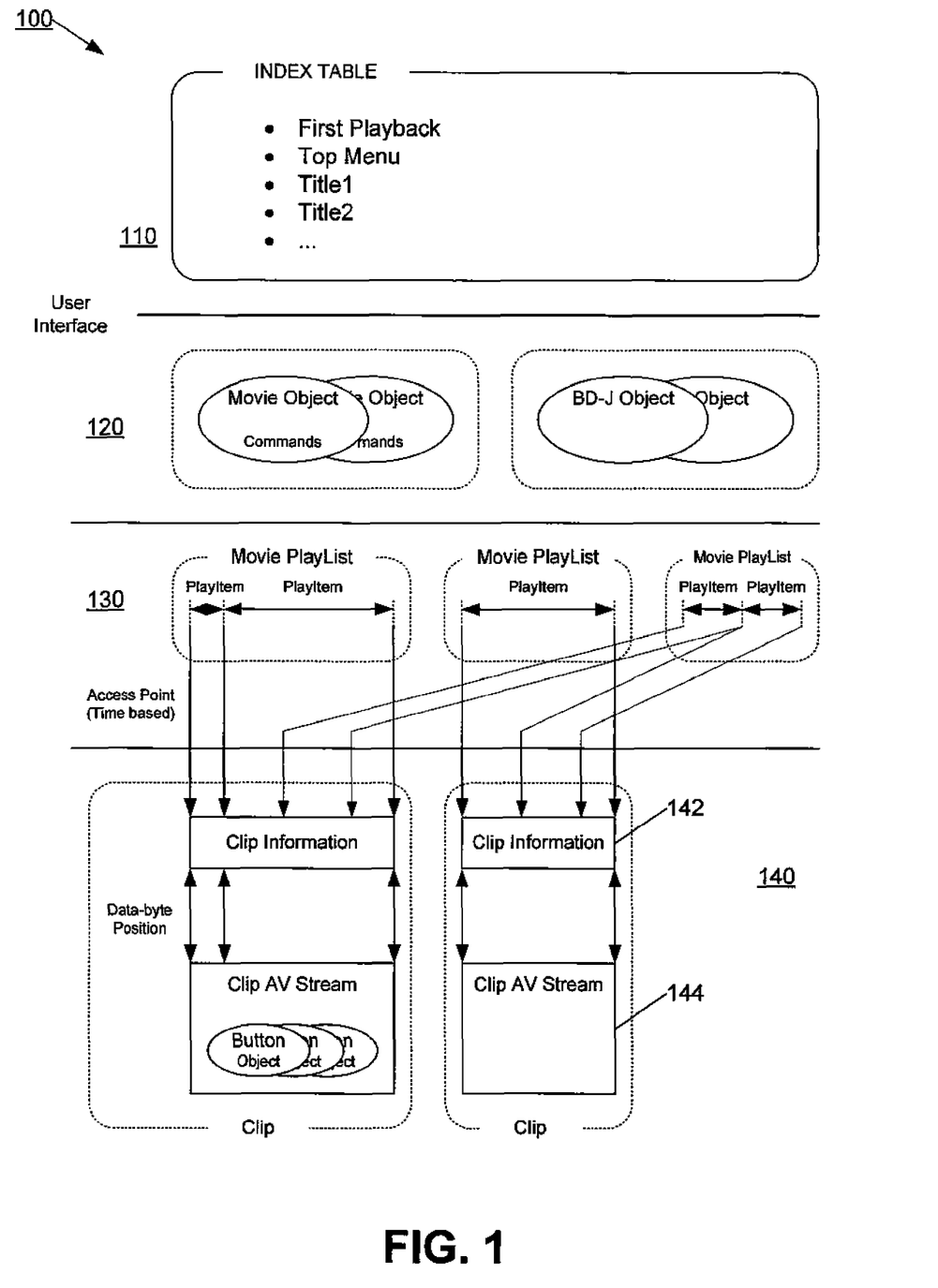
FIG. 1 provides a simplified overview of the BD-ROM data structure.

FIG. 1 shows an overview of the BD-ROM data structure 100. BD-ROM has four layers for managing Audio/Video (AV) stream files as follows: Index Table 110, Movie Object/BD-J Object 120, Playlist 130, and Clip 140.

Figure 2:
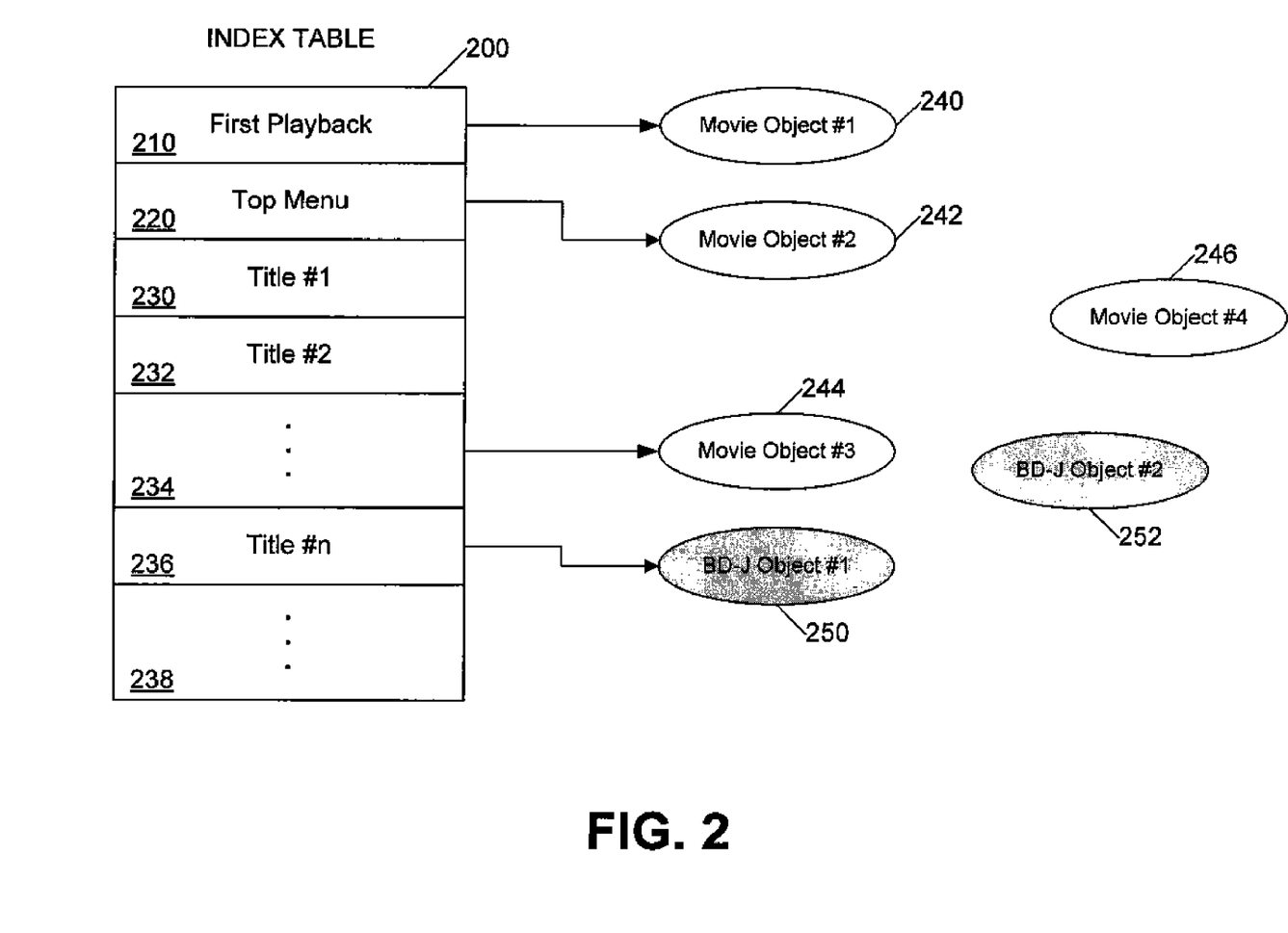
FIG. 2 shows Index Table, which is a top-level table structure that defines the Titles of a BD-ROM disc.

Index Table 200, shown in FIG. 2, is a top-level table structure that defines the Titles of a BD-ROM. A Title corresponds to any entry in the Index Table including First Playback 210, Top Menu 220, and Titles 230, 232, 234, 236, 238. First Playback 210 is used by content providers to perform automatic playback. Each Index Table entry links to either a Movie Object 240, 242, 244, 246 or BD-J Object 250, 252. The disc player references this table whenever a title is to be executed (e.g. whenever the Title Search or Menu Call operation is called).

Figure 3:
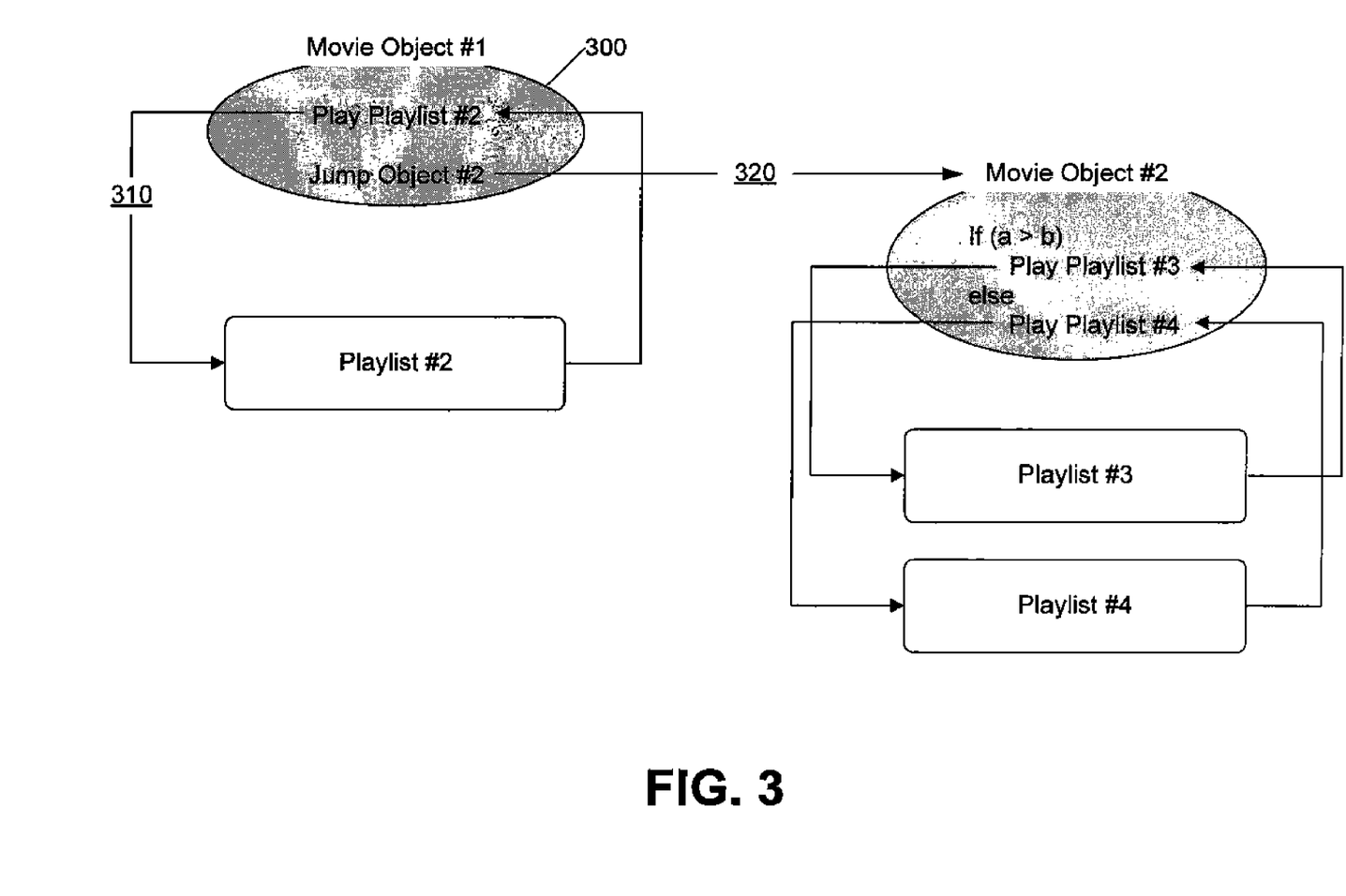
FIG. 3 shows one example of a Movie object including navigation commands that can launch Playlist or another Movie Object.

A Movie Object includes executable lines of codes or navigation commands, which enable dynamic scenario description. Thus, as shown in FIG. 3, navigation commands in a Movie Object (e.g., 300) can launch Playlist playback 310 or another Movie Object 320. This enables the content providers to define a set of Movie Objects for managing playback of Playlists in accordance with a user's interaction and preferences.

When a Title associated with a BD-J Object in the Index Table on disc is selected, the corresponding application is automatically launched and its lifecycle is bound to the Title. A BD-J application is a Java Xlet which is controlled by the BD-ROM player's Application Manager through its Xlet interface. The Xlet interface has four states as follows: loaded, paused, active and destroyed. Once a BD-J application is destroyed, any resources allocated to it, such as memory and AV control, is released.

Figure 4:
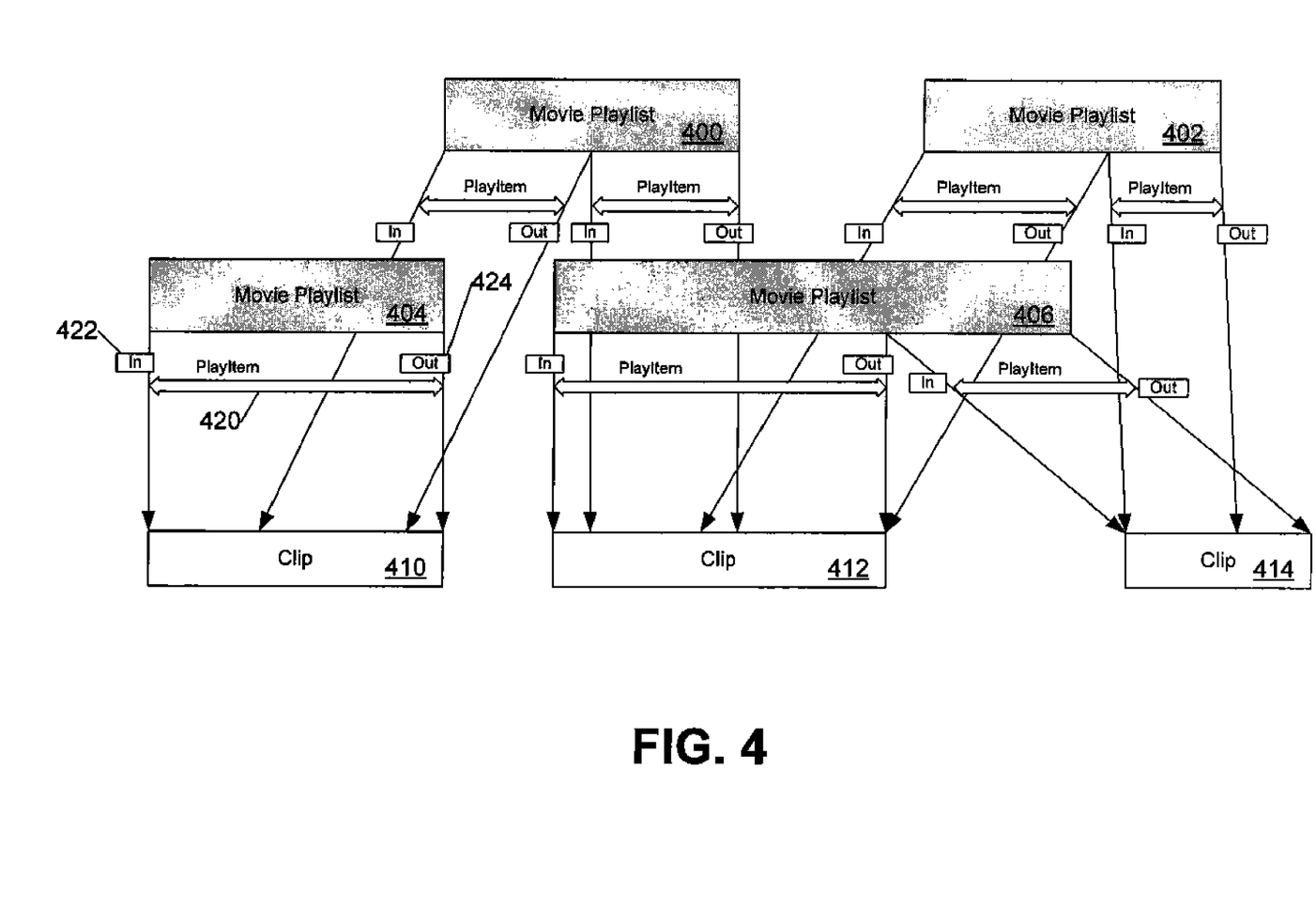
FIG. 4 shows one example of Playlists, which are a collection of playing intervals in the Clips that indicates which portion of the Clip to play and when to play the Clip.

FIG. 4 shows Playlist (i.e., "Movie Playlist") 400, 402, 404, 406, which is a collection of playing intervals in the Clips 410, 412, 414 that indicates which portion of the Clip to play and when to play the Clip. One such playing interval is called a PlayItem (e.g., 420) and includes an IN-point (e.g., 422) and an OUT-point (e.g., 424), each of which refers to positions on a time axis of the Clip. The IN-point indicates a start point of a playing interval, and the OUT-point indicates an end point of the playing interval.

Referring back to FIG. 1, an AV stream file together with its associated database attributes is considered to be one object. In the context of the BD-ROM data structure, the AV stream file is referred to as a Clip AV stream file 144, and the associated database attribute file is referred to as a Clip Information file 142. An object including the Clip AV stream file 144 and its corresponding Clip information file 142 is referred to as a Clip 140.

The Clip Information file 142 stores the time stamps of the access point into the corresponding AV stream file 144. The BD player reads the Clip Information file 142 to find out the position where it should begin to read the data from the Clip AV stream file 144. Therefore, there is a one-to-one relationship between a Clip AV stream file 144 and a Clip Information file 142.

The BD-ROM specification has a defined set of navigation commands that are used to provide navigational control of the BD. The BDAS allows users to author these navigation commands using a high level script language. However, multiple lines of script language representing a large number of navigation commands are often required to be written in a number of places on the disc to accomplish certain disc behaviors. Therefore, in order to simplify the authoring process, the BDAS generates a template code (representing the navigation commands) that is automatically placed at multiple positions on the disc. Thus, the template code allows certain disc behaviors to be achieved using just one or two lines of high level script language code. The BDAS converts these lines of high level code to multiple lines of low level code using a script generator and a compiler. The commands represented by the template code are referred to as templatized commands.

Figure 5:
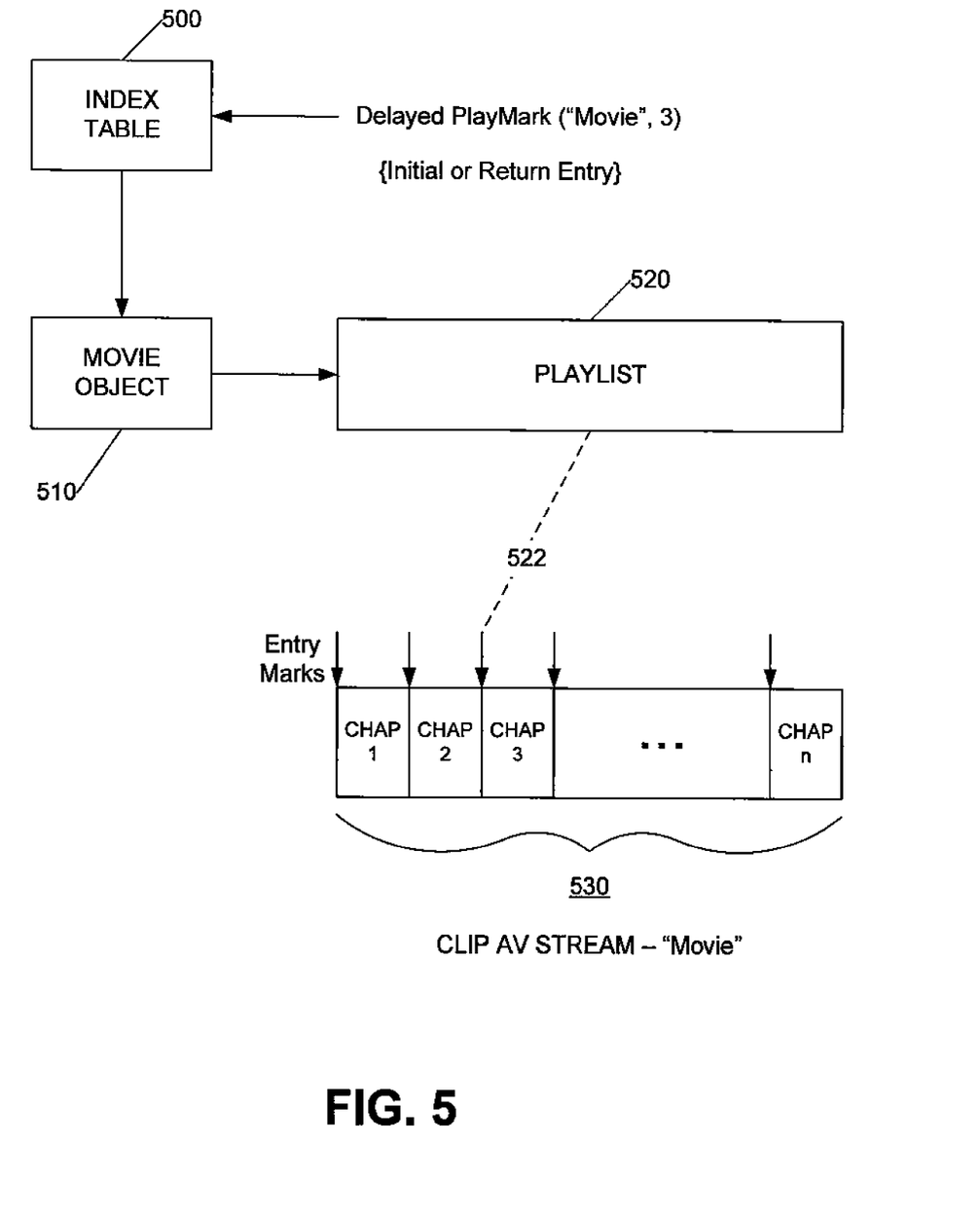
FIG. 5 shows one example of Delayed PlayMark command.

FIG. 5 shows "entry marks", which are typically beginning points of chapters in a movie. Thus, entry marks can be used to jump through a movie. However, the normal navigation scenarios created in Blu-ray Discs do not allow for the Chapter jump buttons in the main menu to access the Playlist of the movie directly, even though such direct jump commands exist in the underlying low level language. This is because in a lot of cases jumps need to be made through the index table in order to achieve certain functionalities. So to play a movie from Chapter 3, for example, first a jump needs to be made to the index table and then from there the movie object for the title needs to execute a play PlayList starting at Chapter 3 command.

In one implementation, the template code is generated by the BDAS to playback an object (e.g., a piece of content) starting from a specific entry mark or PlayItem when playing the next object or when playing a specific object. For example, the Delayed PlayMark command shown in FIG. 5 is a templatized command that starts playback of Playlist 520 at a predetermined entry mark (i.e., Chapter 3) 522 in the "Movie" 530. The BDAS generates a low level code for the button which internally stores the entry mark (i.e., 3) of the templatized command in a register. Then it executes a jump to the title via the Index Table. The fact that this content is not to be played from the beginning and playback must instead be started from chapter 3 is also stored in a general purpose register (Delayed Play Mark flag). Thus, upon initial entry or return entry from playing the previous object, the BD jumps to the Movie Object 510 referenced by the Index Table 500. If the Delayed Play Mark flag is set then the navigation commands retrieve the stored entry mark from the register and start the playback of the Playlist 520 from this acquired entry mark 522. In this case the regular command in the Movie Object that starts the movie from the beginning will be bypassed because the playback was started instead from a specific chapter. A jump to a PlayItem or specific Time in the Playlist can be performed similarly.

Figure 6:
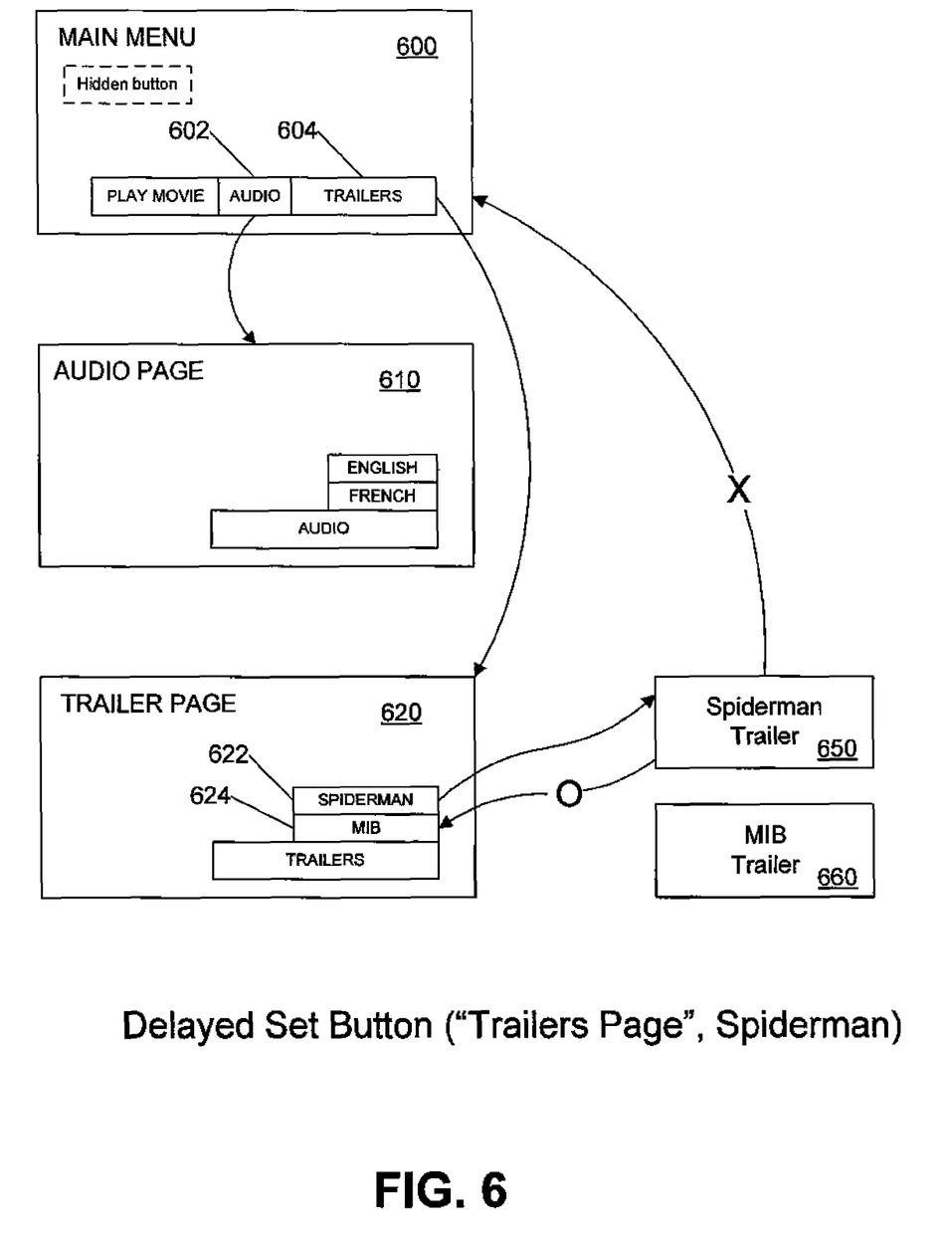
FIG. 6 shows one example of Delayed Set Button command.

In another implementation, the template code is generated by the BDAS to set destination Button and Page information when playing the next object or when playing a specific object. For example, the Delayed Set Button command shown in FIG. 6 is a templatized command that sets the destination page and button. Initially, a main menu page 600, for example, presents "play movie", "audio", and "trailers" buttons. Clicking the "play movie" button plays the movie (not shown). Clicking the "audio" button 602 opens the audio page 610 with clickable buttons "English" and "French". Clicking the "trailers" button 604 opens the trailer page 620. When the "Spiderman" button 622 in the trailer page 620 is pressed, the Spiderman trailer 650 (i.e., the first object) is played. After playing the Spiderman trailer 650, the user is to be returned to the menu and the destination is set to the next button 624 (i.e., the button for the MIB trailer 660) on the same page 620 rather than going back to the main menu 600 which is the only possible behavior if a simple jump is made back to the menu after playback of the trailer. To accomplish this logical but non-standard behavior, the BDAS generates a low level code and internally stores the path to the "Spiderman" button 622 on the trailer page 620 in a general purpose register. Thus, upon initial entry or return entry from playing the previous object, the BD returns to the main menu 600 and then a hidden button automatically executes and takes the user to the trailer page 620 and the "Spiderman" button 622. The actual destination can be made to the next button (i.e., the MIB button 624) by adding one to the destination address.

Figure 7:
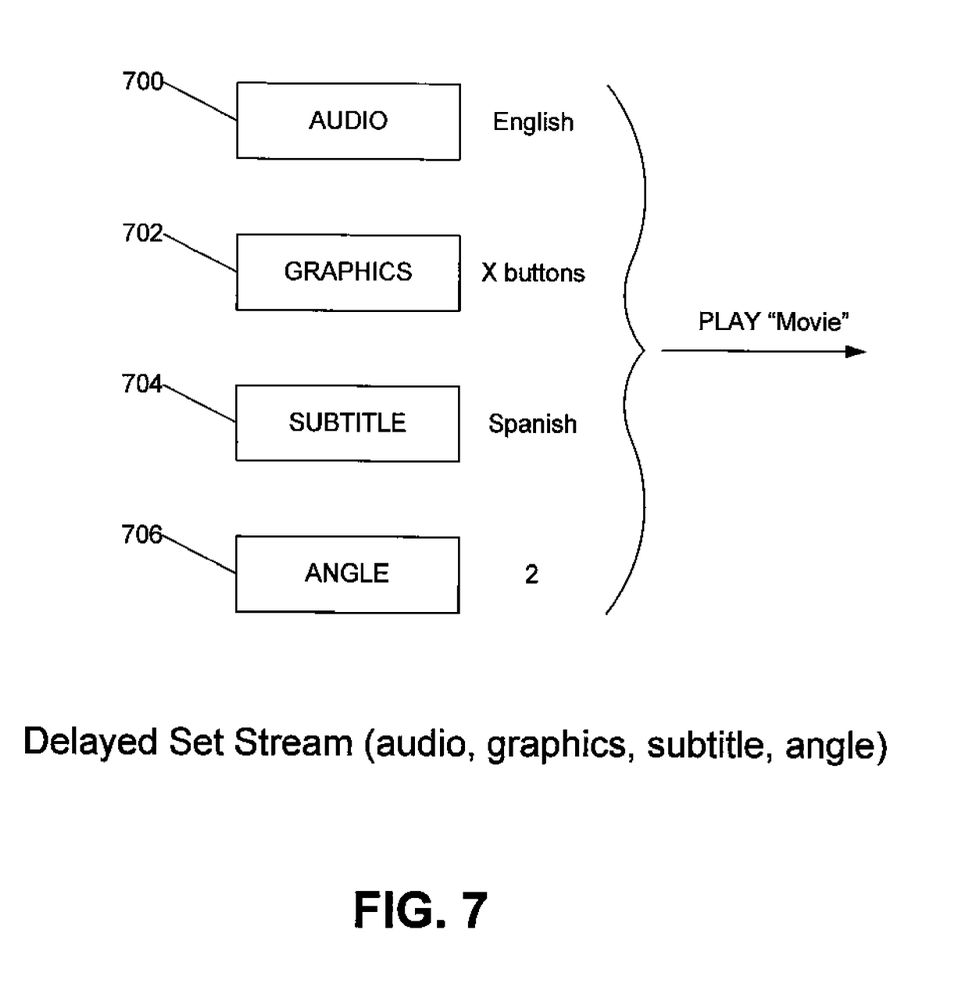
FIG. 7 shows one example of Delayed Set Stream command.

In another implementation, the template code is generated by the BDAS to set specific streams when playing the next object or when playing a specific object. For example, the Delayed Set Stream command shown in FIG. 7 is a templatized command that sets the streams. In the illustrated example of FIG. 7, the audio 700 is set to "English", the graphics 702 is set to "X buttons", the subtitle 706 is set to "Spanish", and the angle 708 is set to "2". The BDAS generates a low level code and internally stores the stream settings of the templatized command in a general purpose register. Thus, a movie can be played with streams set as stated.

In other implementations, the template code is generated by the BDAS to achieve other BD behaviors. In one example, the template code is generated to playback specific transition effects before going to or when coming from a button on a page. In another example, the template code is generated to playback a defined chain of content similar to the operation of virtual playable content. In yet another example, the template code is generated to provide control over resume information in the scenarios described above.

In another implementation, delayed commands can be categorized into two categories: specific and global. The specific delayed command is a command that is to be executed only when a specific object is to be played. For example, the Delayed PlayMark command (see FIG. 5) is a specific delayed command that is to be played only when a movie is to be played since that command includes entry marks for a movie. The global delayed command is a command that is to be executed no matter which object is to be played next. For example, the Delayed Set Stream command (see FIG. 7), which in one example sets language for audio, is a global delayed command that is to be played no matter which object is to be played next. Thus, for example, when the audio is set to English, the audio will be played in English whether the next object to be played is a movie, menu, trailers, or "making of the movie,".

The template code representing the templatized commands can be manually written by the user or generated by the BDAS using graphical connectors that the user can draw from one object to another object. Some of the templatized commands can be exposed using macros, wherein the macros enable the script compiler to convert a single line of high level code to multiple lines of high level code before compiling the high level code. These macros can be used to set a number of command parameters at the same time. In some implementations, the template code can be hidden.

Figure 8:
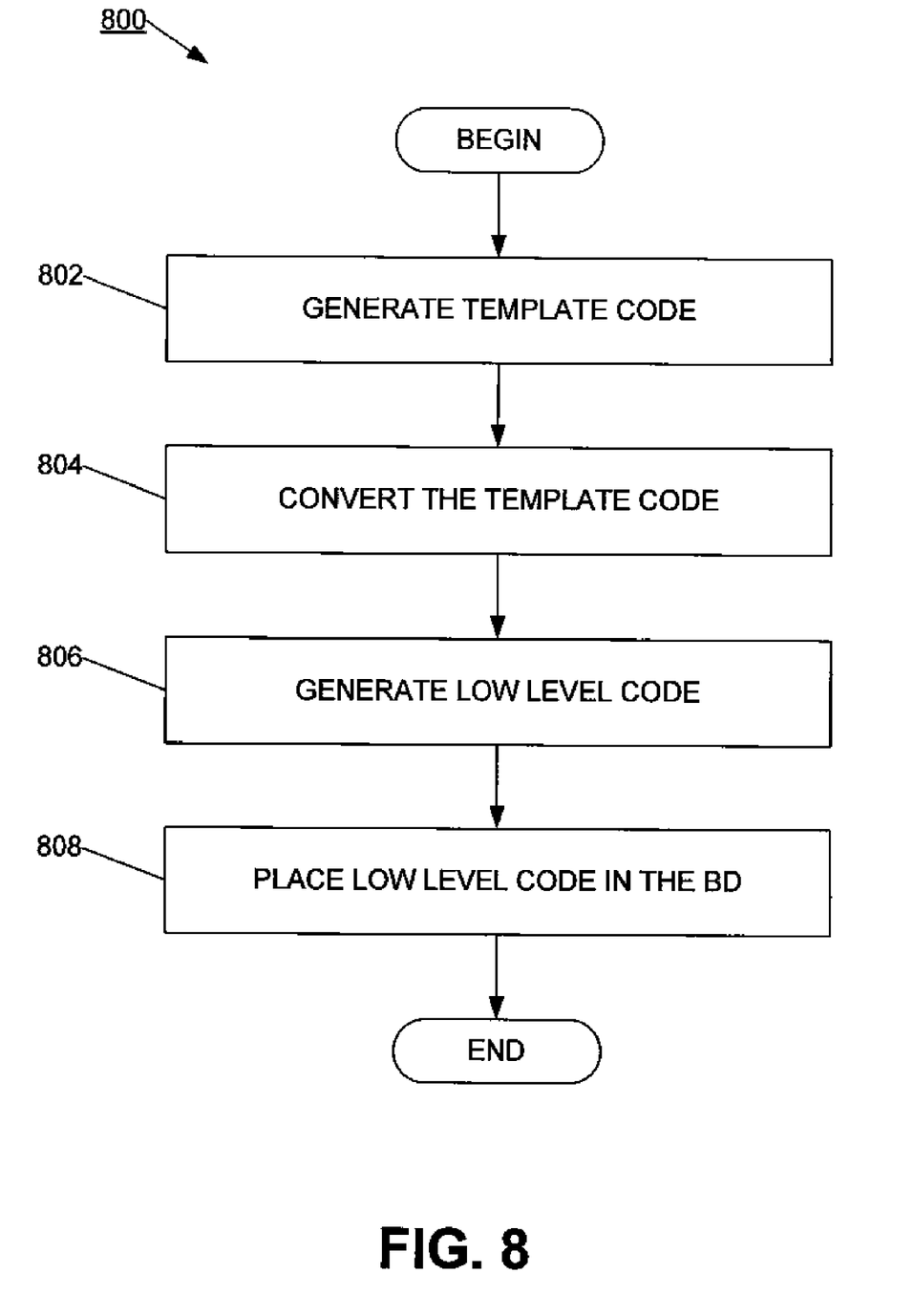
FIG. 8 is a flowchart illustrating a method for authoring a Blu-ray Disc using templatized navigation commands.

FIG. 8 is a flowchart 800 illustrating a method for authoring a Blu-ray Disc using templatized navigation commands. A template code representing the templatized navigation commands is generated, at 802. As discussed above, the templatized commands are used to provide navigational control of the BD using playable content. The template code is converted, at 804, to generate multiple lines of low level code, at 806. The low level code is then placed at multiple positions on the BD, at 808, to effect desired behaviors by the BD.

Figure 9:
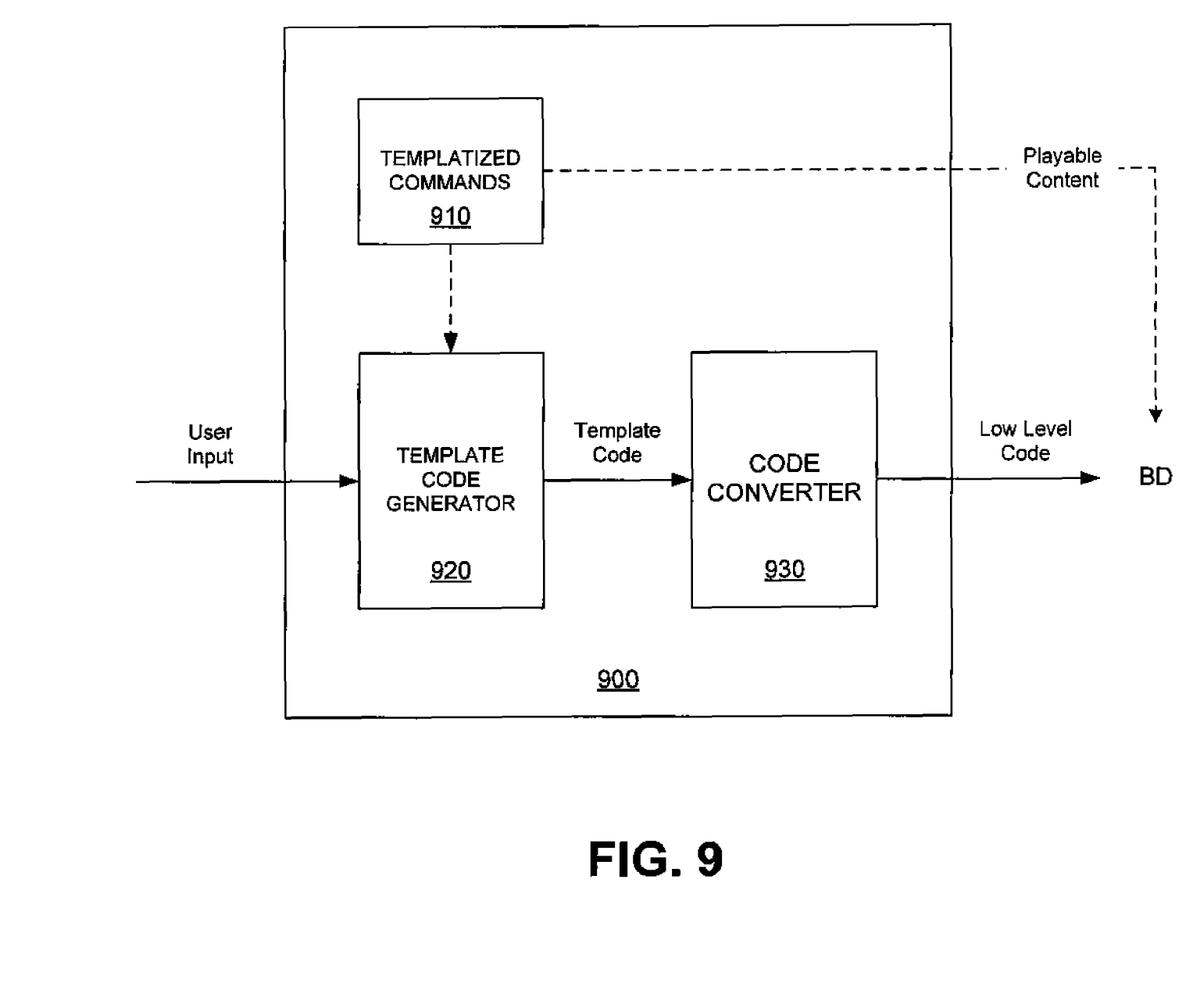
FIG. 9 is a block diagram of a templatized command portion of the BDAS.

FIG. 9 is a block diagram of a templatized command portion of the BDAS 900. In the illustrated implementation of FIG. 9, the templatized command portion of the BDAS 900 includes a template code generator 920 and a code converter 930. The template code generator 920 receives a user input and generates a template code. In one implementation, the template code is manually written by the user. In another implementation, the template code is generated using graphical connectors that the user can draw from one object to another object. The code converter 930 then converts the template code to generate multiple lines of low level code, which are placed at multiple positions on the BD to effect desired behaviors by the BD. In one implementation, the code converter 930 is configured as a script compiler to compile the template code to multiple lines of low level code.

Figure 10A:
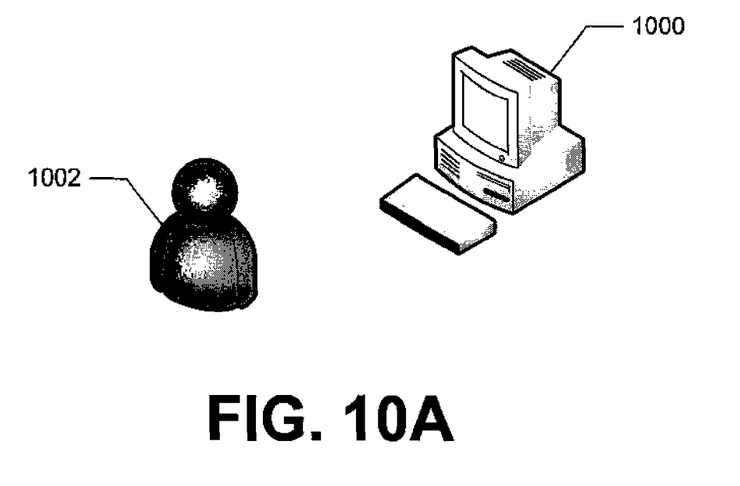
FIG. 10A shows a representation of a computer system and a user.

FIG. 10A shows a representation of a computer system 1000 and a user 1002. The user 1002 can use the computer system 1000 to author a Blu-ray disc. The computer system 1000 stores and executes a templatized command portion of the BDAS 1012, which receives a user input for generating a template code and output multiple line of low level code to effect desired behavior by the BD.

Figure 10B:
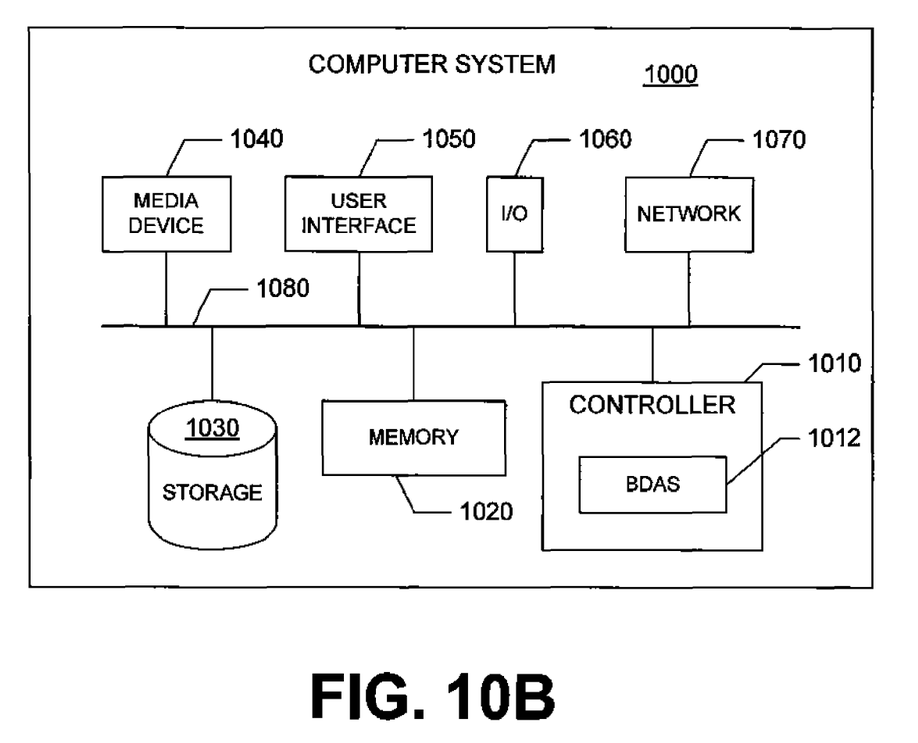
FIG. 10B shows a block diagram of one implementation of the computer system in FIG. 10A, including a templatized command portion of the BDAS.

FIG. 10B shows a block diagram of one implementation of the computer system 1000 in FIG. 10A, including the templatized portion of the BDAS 1012. The computer system 1000 includes a controller 1010, a memory 1020, storage 1030, a media device 1040, a user interface 1050, an input/output (I/O) interface 1060, and a network interface 1070. These components are interconnected by a common bus 1080. Alternatively, different connection configurations can be used, such as a star pattern with the controller at the center.

The controller 1010 is a programmable processor and controls the operation of the computer system 1000 and its components. The controller 1010 loads instructions from the memory 1020 or an embedded controller memory (not shown) and executes these instructions to control the system. In its execution, the controller 1010 provides the templatized command portion of the BDAS 1012 as a software system. Alternatively, this service can be implemented as separate components in the controller 1010 or the computer system 1000.

Memory 1020 stores data temporarily for use by the other components of the computer system 1000. In one implementation, memory 1020 is implemented as RAM. In one implementation, memory 1020 also includes long-term or permanent memory, such as flash memory and/or ROM.

Storage 1030 stores data temporarily or long term for use by other components of the computer system 1000, such as for storing BD data used by the templatized command portion of the BDAS 1012. In one implementation, storage 1030 is a hard disk drive.

The media device 1040 receives removable media and reads and/or writes data to the inserted media. In one implementation, the media device 1040 is an optical disc drive.

The user interface 1050 includes components for accepting user input from the user of the computer system 1000 and presenting information to the user. In one implementation, the user interface 1050 includes a keyboard, a mouse, audio speakers, and a display. The controller 1010 uses input from the user to adjust the operation of the computer system 1000.

The I/O interface 1060 includes one or more I/O ports to connect to corresponding I/O devices, such as external storage or supplemental devices (e.g., a printer or a PDA). In one implementation, the ports of the I/O interface 1060 include ports such as: USB ports, PCMCIA ports, serial ports, and/or parallel ports. In another implementation, the I/O interface 1060 includes a wireless interface for communication with external devices wirelessly.

The network interface 1070 includes a wired and/or wireless network connection, such as an RJ-45 or "Wi-Fi" interface (802.11) supporting an Ethernet connection.

The computer system 1000 includes additional hardware and software typical of computer systems (e.g., power, cooling, operating system), though these components are not specifically shown in FIG. 10B for simplicity. In other implementations, different configurations of the computer system can be used (e.g., different bus or storage configurations or a multi-processor configuration).

Various illustrative implementations of the present invention have been described. However, one of ordinary skill in the art will recognize that additional implementations are also possible and within the scope of the present invention. For example, although the disc authoring system using templatized commands has been described exclusively in terms of the BD format, the system can be used to author discs in formats other than the BD format, such as the DVD format and the HD-DVD format.

Accordingly, the present invention is not limited to only those implementations described above.

What is claimed is:

1. A method of authoring a Blu-ray disc (BD), the method comprising:
   generating a template code representing templatized navigation commands,
   wherein a user authors the templatized navigation commands using multiple lines of script language,
   wherein the template code is automatically placed at multiple positions on the BD, said template code specifying a first object to be processed,
   wherein said templatized navigation commands are used to provide navigational control of the BD using playable content,
   wherein the template code comprises delayed commands that are executed using an index table to accomplish logical but non-standard behavior by the BD, and
   wherein a delayed command comprises a specific delayed command which is to be executed only when a specific object is to be played, and a global delayed command which executes no matter which object is to be played next;
   converting said template code to generate multiple lines of low level code; and
   automatically placing said low level code at multiple positions on the BD to effect desired behaviors by the BD.

2. The method of claim 1, wherein said template code is a single line of high level script language.

3. The method of claim 1, wherein said template code is multiple lines of high level script language.

4. The method of claim 1, wherein converting said template code includes
   compiling said template code using a script compiler.

5. The method of claim 1, wherein generating a template code includes
   exposing the templatized navigation commands using macros,
   wherein the macros enable the script compiler to convert a single line of high level code to multiple lines of high level code before compiling the script.

6. The method of claim 1, wherein generating a template code includes
   manually writing said template code.

7. The method of claim 1, wherein generating a template code includes
   drawing graphical connectors from one object to another object of said playable content.

8. The method of claim 1, wherein providing navigational control of the BD using playable content includes
   playing the first object starting from a predetermined point of the first object.

9. The method of claim 1, wherein providing navigational control of the BD using playable content includes
   playing the first object from a predetermined point of the first object when returning from playing a second object.

10. The method of claim 9, wherein the first object is a movie object that is visually placed after the second object on a page.

11. The method of claim 1, further comprising
    setting parameters for media streams referenced in the first object.

12. The method of claim 1, further comprising
    setting information about button and page referenced in the first object.

13. The method of claim 1, wherein providing navigational control of the BD using playable content includes
    playing predetermined transition effects before going to or when coming from a button on a page.

14. The method of claim 1, wherein providing navigational control of the BD using playable content includes
    playing a predetermined chain of movie objects.

15. The method of claim 1 wherein the specific delayed command comprises a delayed playmark command which enables playback of the specific object starting from a specific entry mark.

16. The method of claim 1, wherein the global delayed command comprises a delayed set stream command.

17. A Blu-ray disc (BD) authoring system, comprising:
    a template code generator configured to generate a template code representing templatized navigation commands, said template code specifying a first object to be processed,
    wherein a user authors the templatized navigation commands using multiple lines of script language,
    wherein the template code is automatically placed at multiple positions on the BD,
    wherein said templatized navigation commands are used to provide navigational control of the BD using playable content,
    wherein the template code comprises delayed commands that are executed using an index table to accomplish logical but non-standard behavior by the BD, and
    wherein a delayed command comprises a specific delayed command which is to be executed only when a specific object is to be played, and a global delayed command which executes no matter which object is to be played next; and
    a code converter to converting said template code to generate multiple lines of low level code, and to automatically place said low level code at multiple positions on the BD to effect desired behaviors by the BD.

18. The system of claim 17, wherein said template code is a single line of high level script language.

19. The system of claim 17, wherein said template code is multiple lines of high level script language.

20. The system of claim 17, wherein said code converter includes
    a script compiler configured to compile said template code into multiple lines of low level code.

21. The system of claim 20, said template code generator includes
    a plurality of macros configured to expose the templatized navigation commands,
    wherein the macros enable said code converter to convert a single line of high level code to multiple lines of high level code before compiling the high level code.

22. The system of claim 17, wherein said template code generator is configured to allow a user to manually write said template code.

23. The system of claim 17, wherein said template code generator is configured to receive a user input of graphical connectors drawn from one object to another object of said playable content, and using the graphical connectors to generate said template code.

24. An apparatus for authoring a Blu-ray Disc (BD), the apparatus comprising:
    means for generating a template code representing templatized navigation commands, said template code specifying a first object to be processed,
    wherein a user authors the templatized navigation commands using multiple lines of script language,
    wherein the template code is automatically placed at multiple positions on the BD, wherein said templatized navigation commands are used to provide navigational control of the BD using playable content, wherein the template code comprises delayed commands that are executed using an index table to accomplish logical but non-standard behavior by the BD, and wherein a delayed command comprises a specific delayed command which is to be executed only when a specific object is to be played, and a global delayed command which executes no matter which object is to be played next;

means for converting said template code to generate multiple lines of low level code; and means for automatically placing said low level code at multiple positions on the BD to effect desired behaviors by the BD.

25. A computer-readable non-transitory storage medium encoded with a computer program for authoring a Blu-ray Disc, the program comprising executable instructions that cause a computer to:

generate a template code representing templatized navigation commands, said template code specifying a first object to be processed, wherein a user authors the templatized navigation commands using multiple lines of script language, wherein the template code is automatically placed at multiple positions on the BD, wherein said templatized navigation commands are used to provide navigational control of the BD using playable content, wherein the template code comprises delayed commands that are executed using an index table to accomplish logical but non-standard behavior by the BD, and wherein a delayed command comprises a specific delayed command which is to be executed only when a specific object is to be played, and a global delayed command which executes no matter which object is to be played next;

convert said template code to generate multiple lines of low level code; and automatically place said low level code at multiple positions on the BD to effect desired behaviors by the BD.

* * * * *